United States Patent [19]

Goertler et al.

[11] 4,347,465
[45] Aug. 31, 1982

[54] CIRCUIT ARRANGEMENT FOR POWER WINDOWS

[75] Inventors: Horst Goertler, Sachsenheim; Friedrich Hetzel, Mühlacker; Uwe Knobloch, Heilbronn-Sontheim; Hans Müller, Mühlacker-Mühlhausen; Hans Prohaska; Horst Rachner, both of Bietigheim-Bissingen; Wolfgang Spieth, Freiberg, all of Fed. Rep. of Germany

[73] Assignee: ITT Industries, Inc., New York, N.Y.

[21] Appl. No.: 166,585

[22] Filed: Jul. 7, 1980

[30] Foreign Application Priority Data

Jul. 4, 1979 [DE] Fed. Rep. of Germany ....... 2926938

[51] Int. Cl.³ .............................................. H02P 1/22
[52] U.S. Cl. ................................. 318/266; 318/286; 318/466
[58] Field of Search ............... 318/445, 449, 450, 466, 318/469, 474, 476, 478, 266, 286, 447, 290, 283, 282, 264; 49/26, 28

[56] References Cited

U.S. PATENT DOCUMENTS

| | | | |
|---|---|---|---|
| 3,513,374 | 5/1970 | Koment | 318/476 |
| 3,581,174 | 5/1971 | Hammer | 318/466 X |
| 3,611,099 | 10/1971 | Kuroyama | 318/476 |
| 3,624,473 | 11/1971 | Robbins | 318/466 X |
| 3,644,811 | 2/1972 | Robbins | 318/266 |
| 4,220,900 | 9/1980 | Mintz | 318/450 X |
| 4,272,708 | 6/1981 | Carle et al. | 318/266 |

Primary Examiner—Ulysses Weldon
Attorney, Agent, or Firm—James B. Raden; William J. Michals

[57] ABSTRACT

A safety control circuit for electric motors of power windows of automotive vehicles and which differentiates between a tight fitting of the window pane and an obstacle blockage. The motor current is selectively detected to provide a signal representative of the instantaneous rather than static current values. The detected signal is compared to a reference signal. When the detected signal exceeds the reference signal by a given value or longer than a predetermined interval, which indicates that an obstacle blockage has occurred, the motor current is switched off or reversed.

1 Claim, 13 Drawing Figures

CIRCUIT ARRANGEMENT FOR POWER WINDOWS

BACKGROUND OF THE INVENTION

The invention starts from a circuit arrangement for driving a movable element, especially for driving panes or the like in motor vehicles.

For instance the motor of window closing installations of motor vehicles has to be switched off or switched to reverse run on grounds of safety, when the pane meets an obstacle. This is ensured in known versions in that a power-dependent value, for instance the motor current, is evaluated, whereby the motor is switched off as soon as this power-dependent value exceeds a given threshold value. It became obvious in practice that the motor current which is needed to drive a tight pane may be bigger than that motor current value which is permissible on grounds of safety. Therefore such window closing installations with a static current evaluation do not meet the requirements of the practice.

It has therefore been suggested to evaluate the temporary change of the motor current and to derive from it a switching signal for switching off or changing over the motor. This dynamic current supervision starts from the fact that the current rise is very steep, when the pane meets an obstacle, but that the current rise is essentially smaller because of an increasing friction.

The invention is based on the problem to create a circuit arrangement which reliably switches off the motor with only a slight effort, when the movable element driven by the motor meets an obstacle, whereby it is to be ensured, that the power increase due to normal friction and sudden and short-term tightness of the drive system do not result in a switching-off or changing over of the motor.

SUMMARY OF THE INVENTION

The invention is thereby based on the idea that a sudden tightness of the movable element as well as running up on an obstacle entails a relatively big power increase per time unit. Thus this criterion is evaluated at first. Now it is to be differentiated, whether this sudden power increase was caused by running on an obstacle or by sudden thightness. This differentiation is made according to the invention in that the power increase is measured, when a given value of the temporary change of the power-dependent value is exceeded and that, when the increase is too big, the motor is switched off or changed over. This differentiation is thereby based on the consideration that, when the movable element is tight the force acting upon it can increase very rapidly indeed, but shortly thereafter this increase is reduced again. If however the movable element meets an obstacle the power increases rapidly to a value which can maximally be supplied by the motor. If thus after a rapid power increase it is stated that thereafter the power remains again approximately constant or only increases slightly, one can assume that only a short-termed trouble was concerned, but that the movable element did not run on an obstacle.

This principle of the invention can be realised in different ways. The temporary change of the power-dependent value can for instance be detected by an analogue or digital differentiator, whose output signal depends on the increase of the power-dependent value over the time. Said output signal is compared with a threshold value, whereby, when the threshold value is exceeded, the instantaneous value of the power-dependent value is stored in a store. The output signal of said store is continuously compared with the instantaneous value of the power-dependent value and finally a switching signal is released as soon as the difference of these two values is bigger than a given threshold value.

Besides it is conceivable to integrate the output signal of the differentiator again and to release a switching signal as soon as the value at the output of said integrator exceeds a given threshold value.

In another embodiment of the invention instantaneous values of the power-proportional value are detected at constant intervals and the differences of successive values are formed, whereby these differences are added up by an addition circuit, when they are bigger than a given reference value, whereby the addition circuit is quenched, when the difference is smaller than this reference value and the addition circuit releases a switching signal at a given sum.

Further advantageous developments of the invention are described below by way of various embodiments.

The present invention deals too with the design of a circuit arrangement which is meant for several motors for adjusting several movable elements. Thereby it is provided that each motor can be controlled upwards and downwards respectively and that the power-dependent values of all motors can be conducted to a central control unit, whereby said central unit, when a switching signal is available, switches at least one of the motors to downward direction.

Thereby solutions are conceivable in which the individual power-dependent values are interrogated continuously and then the respective motor is switched off or changed over. In a simpler embodiment all motors, thus also those which were not switched on by the operating switch, are changed over to downward direction as soon as at least one of the evaluated power-dependent values results in a switching signal.

BRIEF DESCRIPTION OF THE DRAWING

The invention is described below by way of the embodiments shown in the accompanying drawings, in which FIG. 1 is a block diagram of a version of a motor, FIG. 2 a diagram in which the power-dependent value is entered over the time, FIG. 3 a circuit diagram of the switching stage evaluating the power-dependent value, FIG. 4 a circuit diagram of the logic via which the switching signals of the switching stage are evaluated, FIGS. 5 to 9 schematic sketches of embodiments for the control of several motors, FIGS. 10 and 11 various parts of the circuit arrangement of a central control unit, FIGS. 12 and 13 schematic circuit diagrams of further embodiments of the switching stage for supervising power-dependent values.

DETAILED DESCRIPTION

Figure 1:
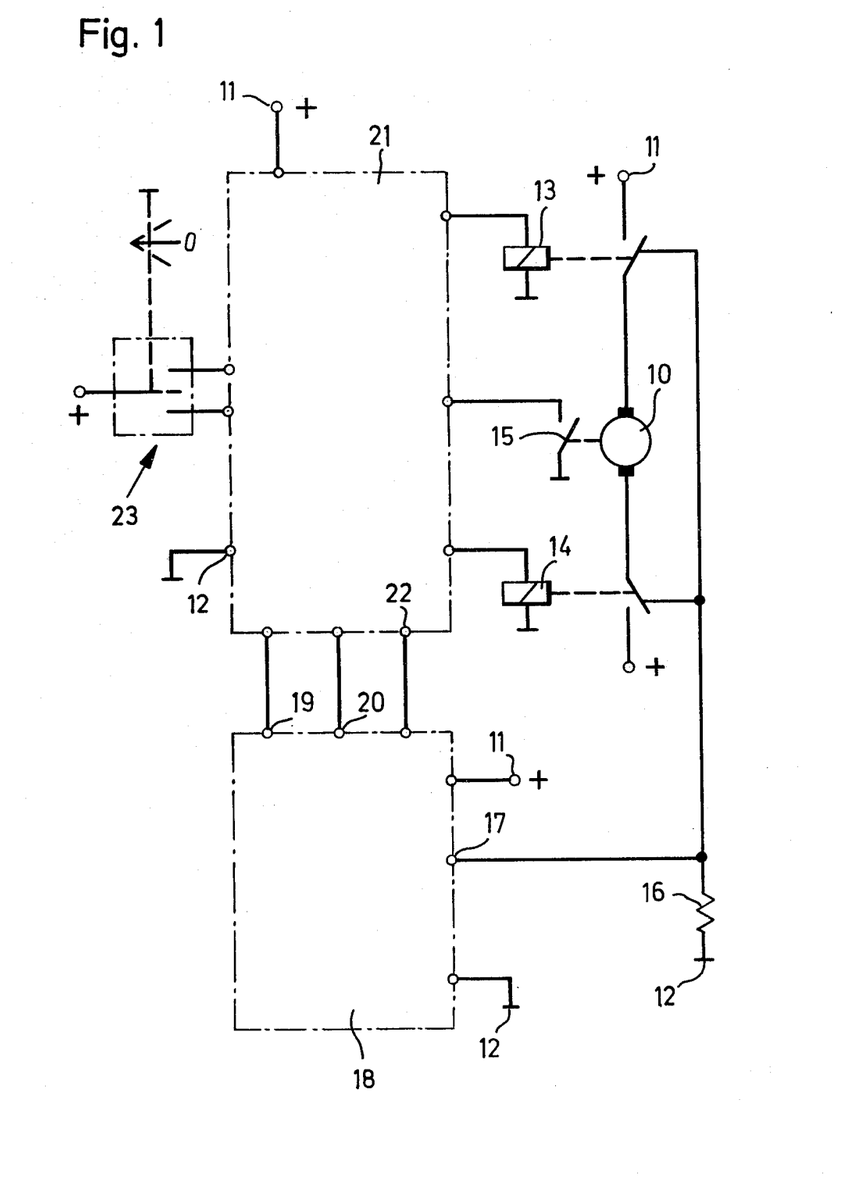

In FIG. 1 a permanent magnet motor is designated by 10, which may be supplied by a voltage source not shown in detail with the positive pole 11 and the negative pole 12. By means of two relays 13 and 14 a two-way switch is realised in such a way that upon actuation of the relay 13 is operated in the one direction of rotation, but upon actuation of the relay 14 in the other direction of rotation. As long as both relays are deenergised, the motor 10 is short-circuited. The motor 10 actuates a position switch 15 which is closed, when for instance in a window closing installation for motor vehicles the pane is conducted to the upper frame up to only a small spacing, whereby this spacing is selected in such a way that it must no longer be feared that an object, for instance a finger, will be squeezed.

The operating current of the motor in both directions of rotation flows over a low-resistance resistor 16, at which a voltage is tapped off. Because the motor current is dependent on the torque and thus on the force acting on the movable element, the voltage tapped off at the resistor 16 can be regarded as power-dependent value. Of course the invention is not restricted to this mode of obtaining the power-dependent value, the torque of the motor can rather be evaluated or a mechanical-electrical converter can be used too.

Figure 3:
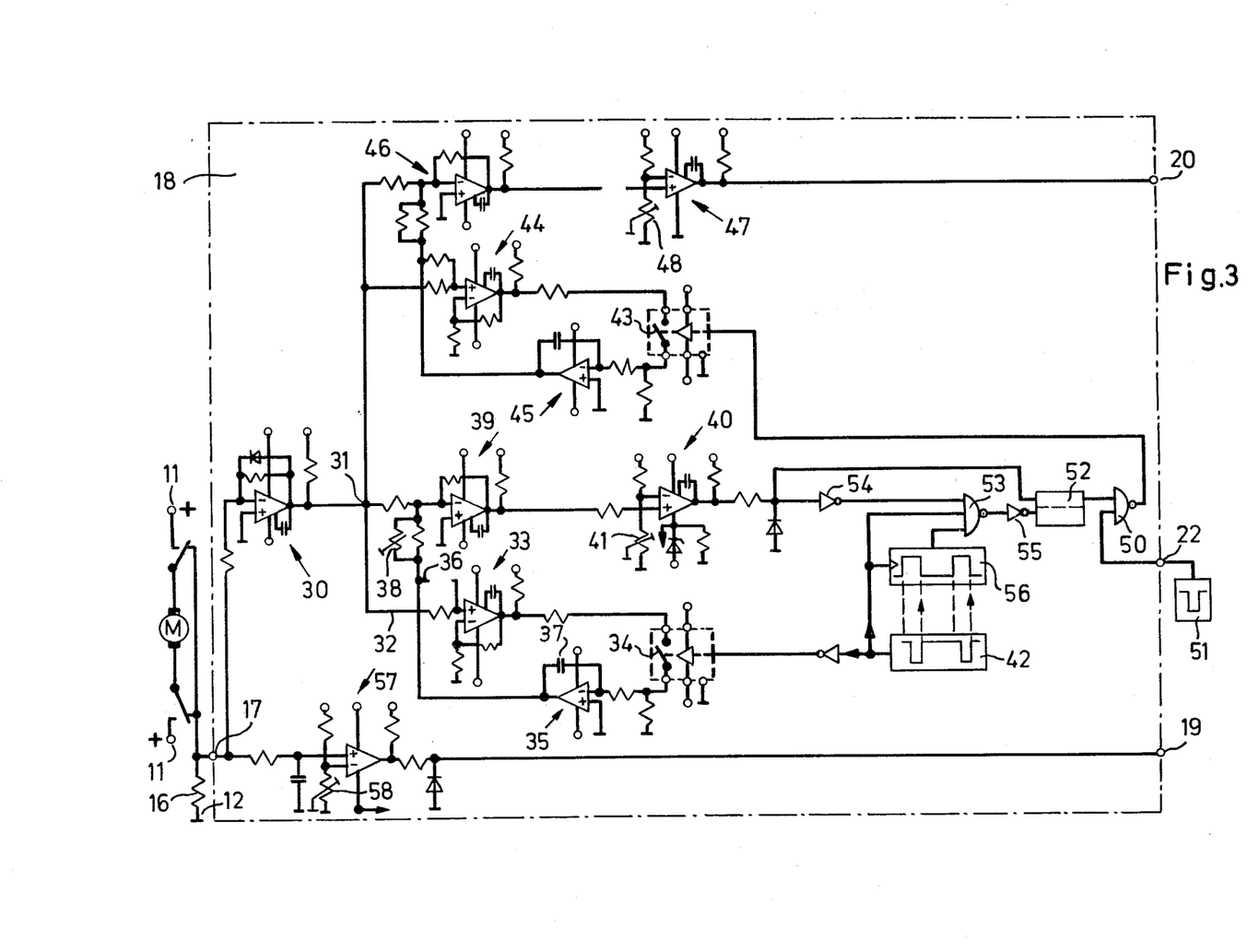

This signal tapped off at said resistor is conducted to the input 17 of a switching stage as a whole designated by 18, which is shown in detail in FIG. 3. The switching stage 18 supplies switching signals for the switching logic as a whole designated by 21 at both inputs 19 and 20. Vice versa the switching logic 21 supplies a control signal for the switching stage 18 at the output 22.

An operating switch is designated by 23, which from the neutral position shown in the drawing can be selectively adjusted into one of two switching positions, in which the motor is controlled in the one or other direction of rotation.

Figure 2:
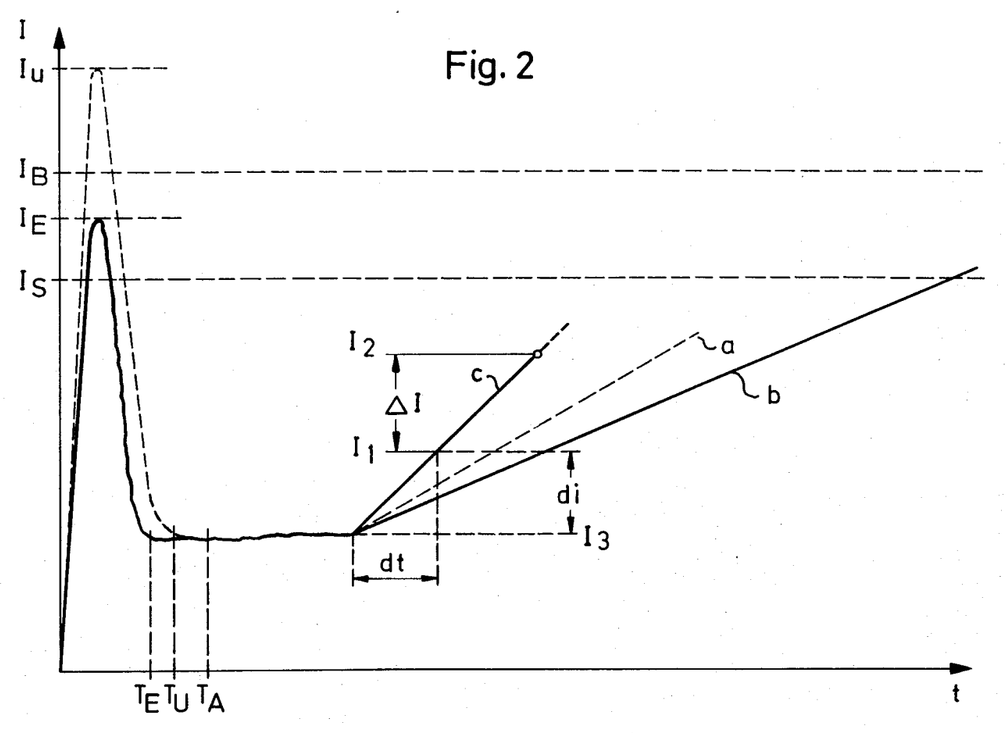

By means of FIG. 2 at first essential characteristics of the power-dependent value, thus in the present case of the motor current, are described in detail. From the time diagram it is to be seen that, when the motor is switched on, the current rises to a switching-on value $I_E$. Then the motor current is reduced again to a normal value during the switching-on time $T_E$. By the dotted lines in FIG. 2 it is indicated, that when the direction of rotation of the motor is reversed, for a short time a much higher current $I_U$ is flowing which during the changeover time $T_U$ drops to the normal value. Because these are normal modes of operation such a current increase may not be followed by a switching-off or changing over of the motor. Therfore a cut-off time $T_A$ was defined which is bigger than $T_E$ or $T_U$, whereby within this cut-off time the motor current is not evaluated or the evaluated signal is blocked.

Additionally the blocking current $I_B$ and a current value $I_S$ are shown in FIG. 2, which current value is not to be exceeded normally.

Especially important for the present invention is the dotted line a of the drawing. This line marks the temporary current increase which is not to be exceeded during undisturbed operation. Consequently a current curve according to line b will not release a switching signal for switching off or changing over the motor until the threshold current $I_S$ is exceeded. In contrast thereto the rise of the current curve c is bigger than that of the line a. Thus in this case there is a trouble, but from the rise alone it cannot be recognised, whether a short-term tightness is concerned or whether for instance a finger has been squeezed. Thereby the power increase is measured in such a way that within a given time interval dt the power increase di is detected and compared with a threshold value. If the threshold value is exceeded in one embodiment of the invention the value $I_1$ is stored and compared with the instantaneous current. If in case of trouble the pane meets an obstacle the motor current continues to increase and finally reaches the value $I_2$. The difference $I_2$ minus $I_1$ thereby exceeds a particular and previously entered threshold value, whereupon a switching signal for switching off or changing over the motor is released. Thus the above difference characterises the power increase which in the case of trouble for instance acts on a finger. This value has to be restricted on grounds of safety. In this connection it is essential that this value is completely independent of the previously measured value of the operating current, so that current changes due to for instance changing friction in guiding the pane do by no means affect the switching-off threshold.

The switching stage 18 evaluating the motor current is described in detail by way of FIG. 3. The voltage on the measuring resistor 16 is conducted to the switching stage 18 via the input 17, to which an inverter for signal adaptation as a whole designated by 30 follows. The exact wiring of this inverter as well as that of the other circuits made of operational amplifiers is known and is therefore not described in detail. At the switching point 31 a signal may be tapped off, which follows the motor current. This signal is continuously conducted to the one input 32 of an adjustable gain amplifier 33. The output signal of said adjustable gain amplifier 33 is via a switch 34 switched onto an integrator 35, whose output signal is conducted to the other input 36 of the adjustable gain amplifier 33. As long as the switch 34 is closed, the capacitor 37 of the integrator 35 is charged until the output signal of the integrator is equal to the signal at the switching point 31. When the switch 34 is opened, the regulating circuit is interrupted and the capacitor charges on the whole remains constant. Thus a store is realised by these circuits the value of the motor current which is given when the switch 34 is opened.

Among other things the output signal of said integrator 35 is via a balancing resistor 38 conducted to a subtraction circuit 39 whose other input is located at the switching point 31. Said subtraction circuit 39 compares the instantaneous current value with that which was previously stored and controls a threshold switch as a whole designated by 40. The threshold of said switch 40 is adjusted by means of the trimmer 41. As soon as the output signal of the subtraction circuit 39 exceeds the adjusted threshold, the potential at the output of the threshold switch 40 changes abruptly to nearly positive voltage.

The switch 34 is controlled by a clock generator 42 in such a way that it is closed for a short time at the beginning of a measure time interval, but otherwise is opened. At the beginning of each measure time interval, which corresponds to the time dt of FIG. 2, thus the instantaneous current value is stored. If now, during the course of the measure time, the actual current exceeds the threshold given by the threshold switch 40, the temporary current increase is bigger than permissible. Thus with the part of the switching stage 18 described until now the temporary change of the power-dependent value is detected and compared with a threshold value. When the threshold value is exceeded a control signal may be measured at the output of the threshold switch 40. This control signal is conducted to a further switch 43 under certain circumstances which will be described in detail below and the switch is thereby opened.

One can see in FIG. 3 by comparison that a further store is formed by the adjustable gain amplifier 44, the switch 43 and the integrator 45, whereby this store stores the current value given, when the switch 43 is opened. When the switch 43 is opened by a control signal, thus the store is practially blocked. Because this is the case, if a too high current increase has been detected, a value corresponding to the current value $I_1$ of FIG. 2 is stored in the integrator 45. This stored value is compared with the instantaneous value on the switching point 31 in the subtraction circuit 46 and conducted to a further threshold switch 47. The threshold value is adjusted by trimmers 48. The output of this threshold stage 47 is identical to the output 20 of the switching stage. At said output 20 a first switching signal may be measured, which induces the electric motor 10 to switch off or to change over.

The control signal is conducted to the switch 43 via a NAND-gate 50, which is acted upon by a monoflop 51. Said monoflop 51 is a component part of the switching logic 21, however also shown in FIG. 3 for better understanding. It is triggered at any time the operating switch 23 is actuated or the direction of rotation of the motor is reversed and produces a pulse for the cut-off time $T_A$ mentioned in FIG. 2 through which the switch 43 is closed. During said cut-off time the voltage at the output of the integrator thus corresponds to that at the switching point 31, so that the threshold stage 47 does not respond. During said cut-off time thus the release of a switching signal at the output 20 is prevented. The NAND-gate 50 is connected to the output of a store 52. If this store is set out of the cut-off time, the switch 43 is opened. The store is set as soon as the threshold switch 40 responds. It is reset as soon as the output of the threshold switch the potential jumps back, thus as soon as the increase of the motor current falls below the threshold shown in FIG. 2. Because this is periodically the case, when the switch 34 is closed and thus the integrator 35 is recharged, one has to take care that the reset signal is blocked during this time. This is achieved in that on the one hand the signal of the clock generator 42 is switched on an input of the NAND-gate 53 and on the other hand a further signal of a monoflop 56 is conducted to one input of said NAND-gate 53, whereby said monoflop 56 is triggered by the rising slope of the signal of the clock generator 42, so that shortly before that time at which the switch 34 is closed, the two last mentioned inputs of the NAND-gate 53 are applied to high potential. This means that only at that time before the beginning of the next measuring cycle the signal at the output of the threshold switch is switched to the reset input of the store 52.

The switching stage 18 has a further threshold switch 57 whose threshold is adjusted by the trimmer 58. Thereby the threshold corresponds to the current value $T_S$ shown in FIG. 2. At the output 19 of this threshold stage 57 a signal may be measured at any time, when the instantaneous current value exceeds this threshold. The switching signal at the output 19 thus can be designated as a static switching signal, whereas the switching signal at the output 20 is obtained because of a dynamical current evaluation. The latter can only appear, if previously a steep current increase has been recognised which corresponds to a too big temporary power increase.

The effects of these switching signals are described below by way of FIG. 4. In the rest position the stores 60, 61, and 62 are reset. The output of the monoflop 51 is applied to high potential and also the output of a further timing element 63. The switching elements switching the motor 10, namely the relays 13 and 14 are de-energised. The motor 10 is short-circuited.

Figure 4:
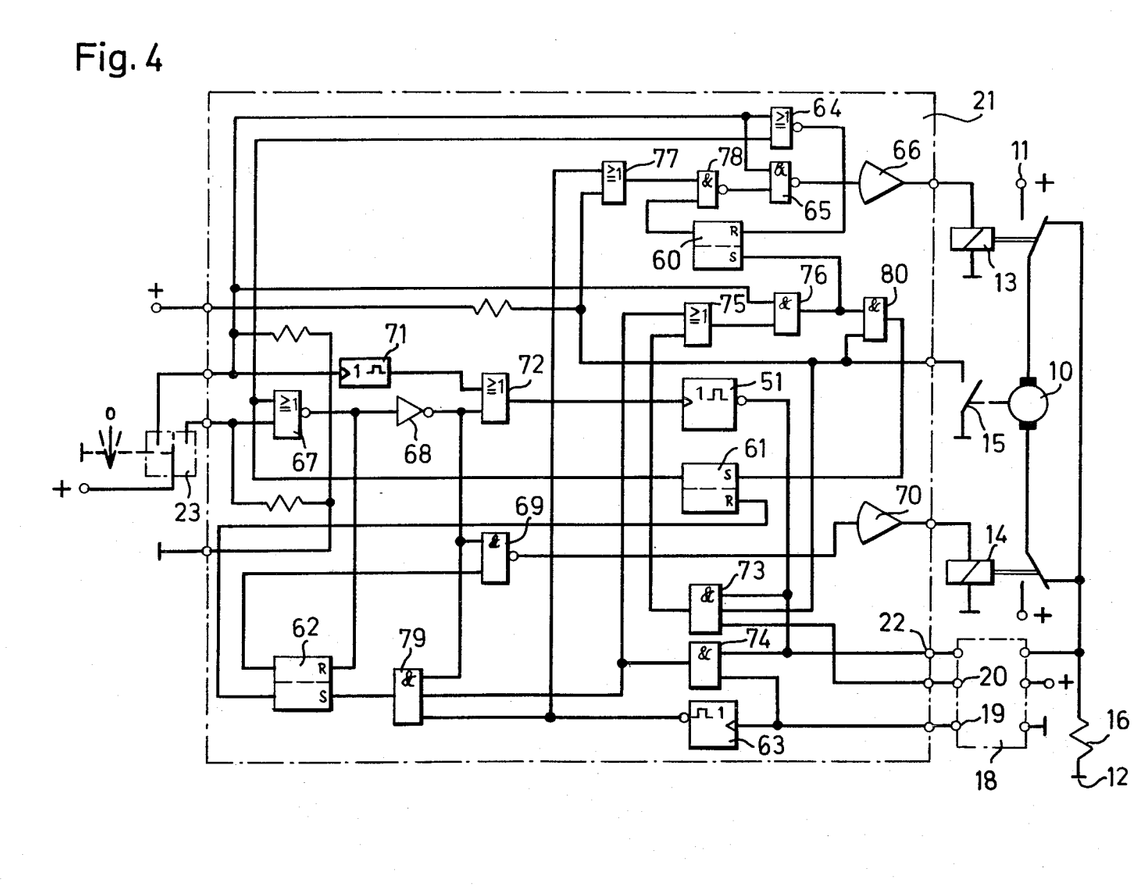

If now the operating switch 23 in FIG. 4 is adjusted to the left, the inverting amplifier 66 is controlled via the NAND-gate 65 and thus the relay 13 becomes excited. The motor 10 rotates in a direction of rotation which closes the window. If no trouble occurs and the switch 23 is returned to its neutral position, the motor 10 is immediately short-circuited, because the relay 13 releases again. If the operating switch 23 is changed over to the other switching position the inverting amplifier 70 is via the NOR-gate 67, the inverter 68, the NAND-gate 69 controlled and thus the relay 14 for downward operation becomes excited.

When the operating switch 23 is actuated the monoflop 51 is triggered and that either via a monostable timing element 71 or via the NOR-gate 67, the inverter 68 and the OR-gate 72. The two gates 73 and 74 are blocked, when the monoflop 51 is triggered. The dynamical switching signal at the output of the switching stage 18 is blocked in this manner. Also the static switching signal at the output 19 of the switching stage 18 is blocked via the gate 74. The outputs of the two gates 73 and 74 are switched to an OR-gate 75 whose output signal is conducted to a gate 76 which is only opened, when the operating switch 23 is changed over into the switching position for upward operation. From this follows that the switching signals as such are only evaluated during upward operation.

In the following description it is assumed that upward operation is switched on and the window is to be closed without trouble. Thereby the position switch 15 is closed shortly before the window enters the upper frame, which at first causes that the gate 73 is blocked. The dynamical switching signal can no longer be evaluated. When the window enters the frame the static current is, however, increased to such an extent that the current value $I_S$ is exceeded. Thus the store 60 is set via the gate 74, the OR-gate 75 and the gate 76. But the output signal of said store 60 at first does not have any effects. It has indeed to be considered that with the release of the static switching signal at the same time the monostable timing element 63 is triggered, whose output jumps to earth potential for a time of for instance 300 msec. Because also the other input of the OR-gate 77 is applied to earth due to the closed position switch 15, earth potential is applied to one input of the NAND-gate 78 following the store 60, so that the change in the switching condition of the store 60, is not processed by said NAND-gate 78. But when the instable phase of the timing element 63 expires, the NAND-gate 68 changes over, affects the NAND-gate 65 and switches off the relay via the inverting amplifier 66. The motor 10 is brought to a standstill.

Hereby it is essential that the static switching signal is evaluated with delay by the timing element 63, whereby it is to be ensured that the pane driven by the motor 10 reliably enters the frame completely. Thereby it is accepted that possibly for this time interval of the timing element 63 an increased motor current will flow, which indeed is not permissible during normal operation. But as far as safety is concerned this is not risky, because the position switch 15 previously recognised that squeezing of any subject has no longer to be feared.

Now it is assumed that the operating switch 23 is changed over to downward operation and that the relay 14 is excited. In this case the evaluation of the dynamical switching signal at the output 20 is blocked, because the gate 76 is blocked. But the static switching signal is evaluated instead. During downward operation the one potential of an AND-gate 79 is switched to high potential via the NOR-gate 67 and the inverter 68. The second input connected with the gate 74 carries also high potential as soon as the static switching signal is available at the output 19 of the switching stage 18. But at the same time the monostable timing element 63 is triggered again, so that only after expiration of the delay time of said timing element also the third input of said AND-gate 79 carries positive potential and thus the store 62 is set. Thereby the inverting output of said store 62 jumps to earth potential, so that at the output of the NAND-gate 69 positive potential may be measured and thus the relay 14 is de-energised via the inverting amplifier 70. Thus also during downward operation the static switching signal is evaluated with delay.

Now it is assumed that upward operation is switched on and a dynamical or static switching signal is available, whereby the position switch 15 is to be opened. Thus in the previously described manner the OR-gate 75 is controlled via the gate 73 or 74 and the store 60 is set via the gate 76. By setting the store 60 the relay 13 becomes de-energised. But at the same time via the gate 80 the store 61 is set whose output signal is switched to the other input of the NOR-gate 67, so that the monoflop 51 is triggered again in the manner described above. When the direction of rotation of the motor is reversed the gate 73 and the gate 74 respectively is blocked again, so that the switching signals are not evaluated for the cut-off time. Besides the relay 14 for downward operation is excited in the manner described for switching-off operation by the switching signal of the store 61, which practically replaces the switching signal of the operating switch 23 during downward operation, via the NOR-gate 67, the inverter 68, the NAND-gate 69 and the inverting amplifier 70. Thus the direction of rotation of the motor is reversed, when a switching signal is available during upward operation. This condition continues to exist until the store 61 is reset. This is the case as soon as the store 62 is set whose non-inverting output is connected to the reset input of the store 61. The store 62 is set as soon as in the above described manner with completely opened window the current value again exceeds the static threshold current $I_S$ and the delay time of the timing element 63 has expired. To summarize what is said to this switching logic which is combined in the circuit 21 it has to be mentioned that indeed too high static and dynamical currents or forces are created, when the pane moved into the upper end position, but that no compulsory downward movement follows, because this is prevented by the position switch 15. But the motor is only switched off after a delay time. During the downward movement the switching stage reacts only to too high static currents, whereas the dynamical switching signal is blocked. The currents $I_U$, $I_B$ appearing during normal operation but actually not permitted are cut off, because the monoflop 51 is triggered at any time the operating switch is actuated or the direction of rotation of the motor is reversed. In case the motor is already blocked, when it is switched on, the static signal is evaluated as soon as the monoflop 51 is reset again. Only during the upward movement the dynamical switching signal is evaluated too, whereby this switching signal then causes a compulsory downward movement of the pane until the lower end position is reached. It is of course conceivable to interrupt this downward movement after a given time interval has expired, because it can be assumed, that the squeezed object will be free again then.

Figure 5:
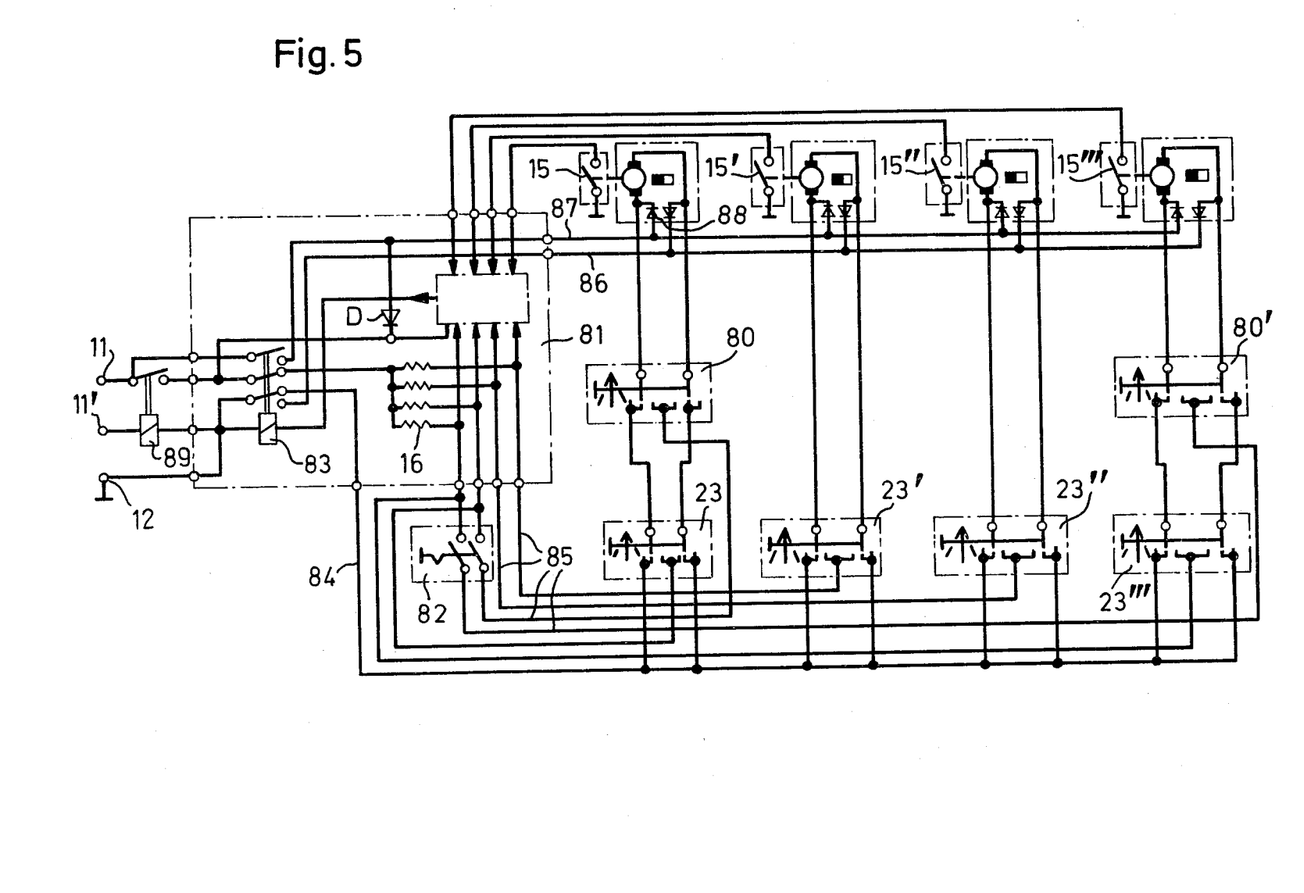
Figure 6:
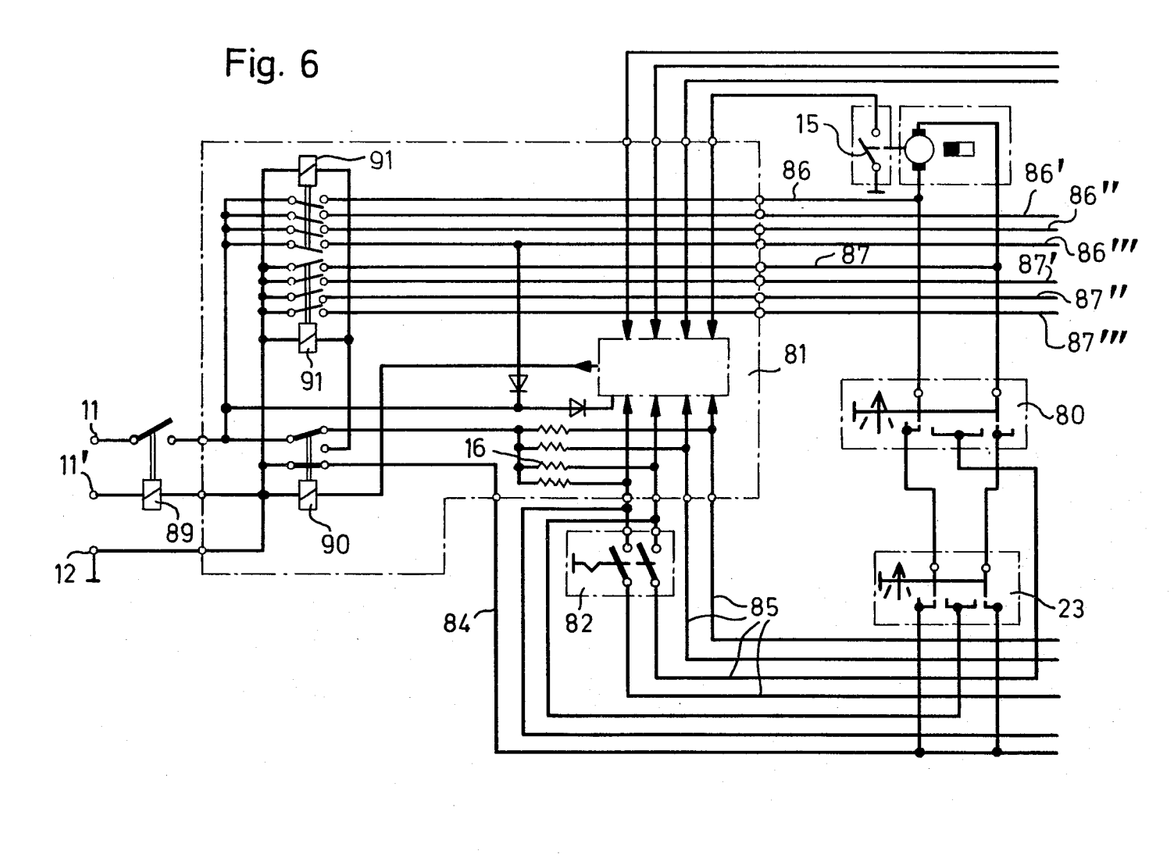

In the FIGS. 5 to 9 various embodiments of window lifter installations are shown, in which several movable elements are controlled via one motor each. In FIG. 5 a total of four motors are shown, to which one operating switch 23 each is assigned. All these operating switches 23 are accommodated in the console of the vehicle, so that the driver can move all panes of the vehicle. Additionally further switches 80 are provided for the two windows at the back which are installed in the respective door and can be actuated by the passengers. One recognises from FIG. 5 that these operating switches 80 or 23 are all developed as two-way switches, so that the motors can selectively be switched on in upward or downward operation by these switches. To each motor a position switch 15 is assigned, whose switching signals are conducted separately to a central control unit as a whole designated by 81. Besides one recognises in FIG. 5 that from the operating switches 23 or 80 leads are conducted to the central control unit, to which a measuring resistor 16 each is connected. Thereby the leads from the switches 80 or 80' are conducted via a safety switch 82, which can be only acutated by the driver, so that the windows at the back of the vehicle cannot be opened without the drivers permission by the passengers. The central control unit 81 has a switching stage for evaluating the power-dependent values, which are tapped off at the resistors 16, as well as a switching logic, which in principle functions as described above. If a static or dynamical switching signal is available, a relay 83 is energised. This relay 83 operates three bridging contacts which, seen as a whole, are operating like a two-way switch. It may be recognised, that in the rest position the earthing connection 84 is acted upon the contacts of said relay 83 and the positive connections 85 to the operating switches are acted upon via the resistors 16. If in contrast thereto the relay 83 is excited, these leads 84 and 85 are interrupted and the leads 86 and 87 are connected instead. All motors 10 are connected to these control leads 86 and 87, whereby indeed a de-coupling via the diodes 88 is provided. The latter fact is important in order to prevent that all motors 10 can be controlled by one operating switch. The potential for these control leads 86 and 87 is thereby selected in such a way that all motors are compulsorily moved downwards, when the relay 83 is excited.

In connection with FIG. 5 it is additionally pointed out that the control lead is directly connected to the positive pole of the vehicle battery via a contact of the relay 83. However a manual operation of the window lifter installation is only possible, when the ignition is switched on, for a relay 89 is only energised, if positive potential is applied to the terminal 11' via an ignition switch not shown in detail. In this manner it is to be secured that the compulsorily downward movement is also carried out, if in case of trouble the driver switches off the ignition of the vehicle erroneously. Besides it is indicated in FIG. 5 that the supply of the switching stage or the switching logic via a diode D is also ensured, when the ignition switch is switched off. By means of the wiring of the switches 23 and 80 one recognises that these switches are coupled with each other in such a way that the switch 23 has priority. This means that the driver can determine the direction into which the motor and thus the window is to be moved independently of the switching position of the switch 80 actuated by a passenger.

In the version according to FIG. 5 only two control leads 86 and 87 are necessary for the compulsory introduction of the downward movements. These leads are conducted to all motors. In the central control unit a sole relay 83 is provided. It is however in a certain way disadvantageous that to each motor two decoupling diodes are assigned via which the motor current flows and which have therefore to be loaded accordingly. The last mentioned disadvantage is avoided in the version according to FIG. 6. Here two leads 86, 87 or 86', 87' are conducted to each motor from the central control unit 81. Also the relay which switches these control leads is very complicated. By comparison of the FIGS. 6 and 5 one recognises that, when a switching signal is available, at first a relay 90 is connected which interrupts the supply voltage for the individual operating switches. At the same time two relays 91 are excited via a make contact of the relay 90 which relays apply the control leads 86 or 87 to voltage in a suitable manner.

Figure 7:
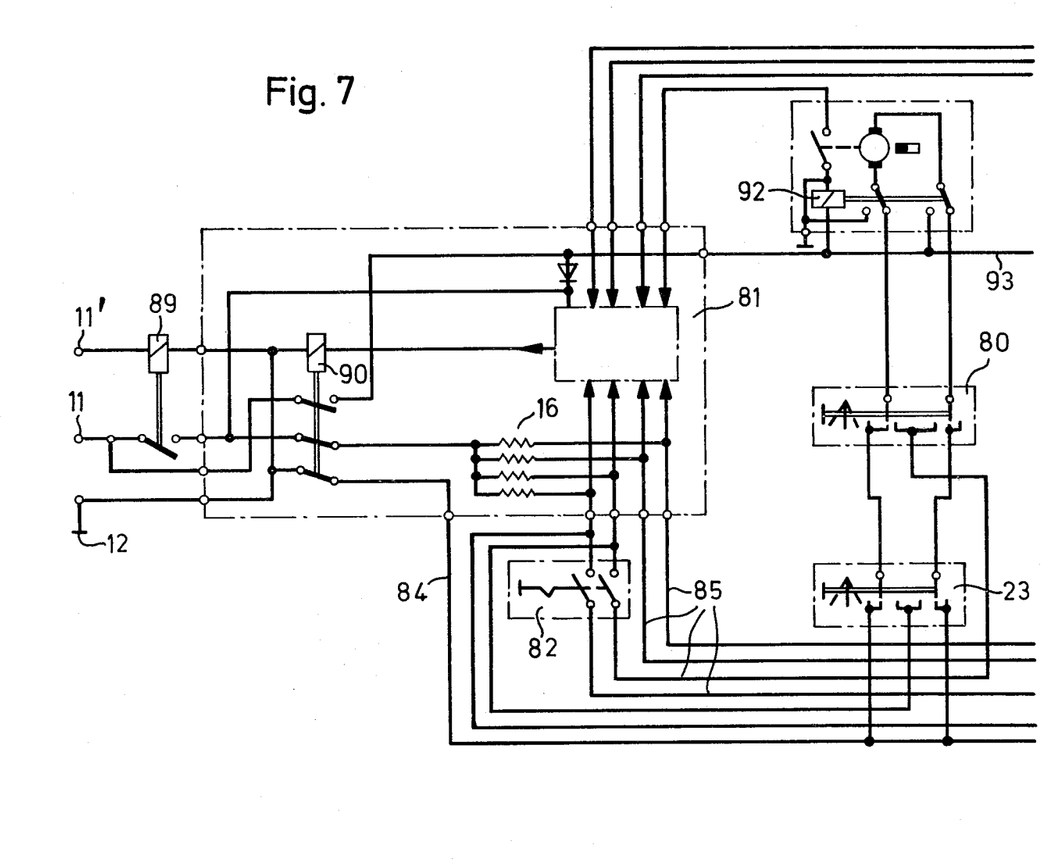
Figure 8:
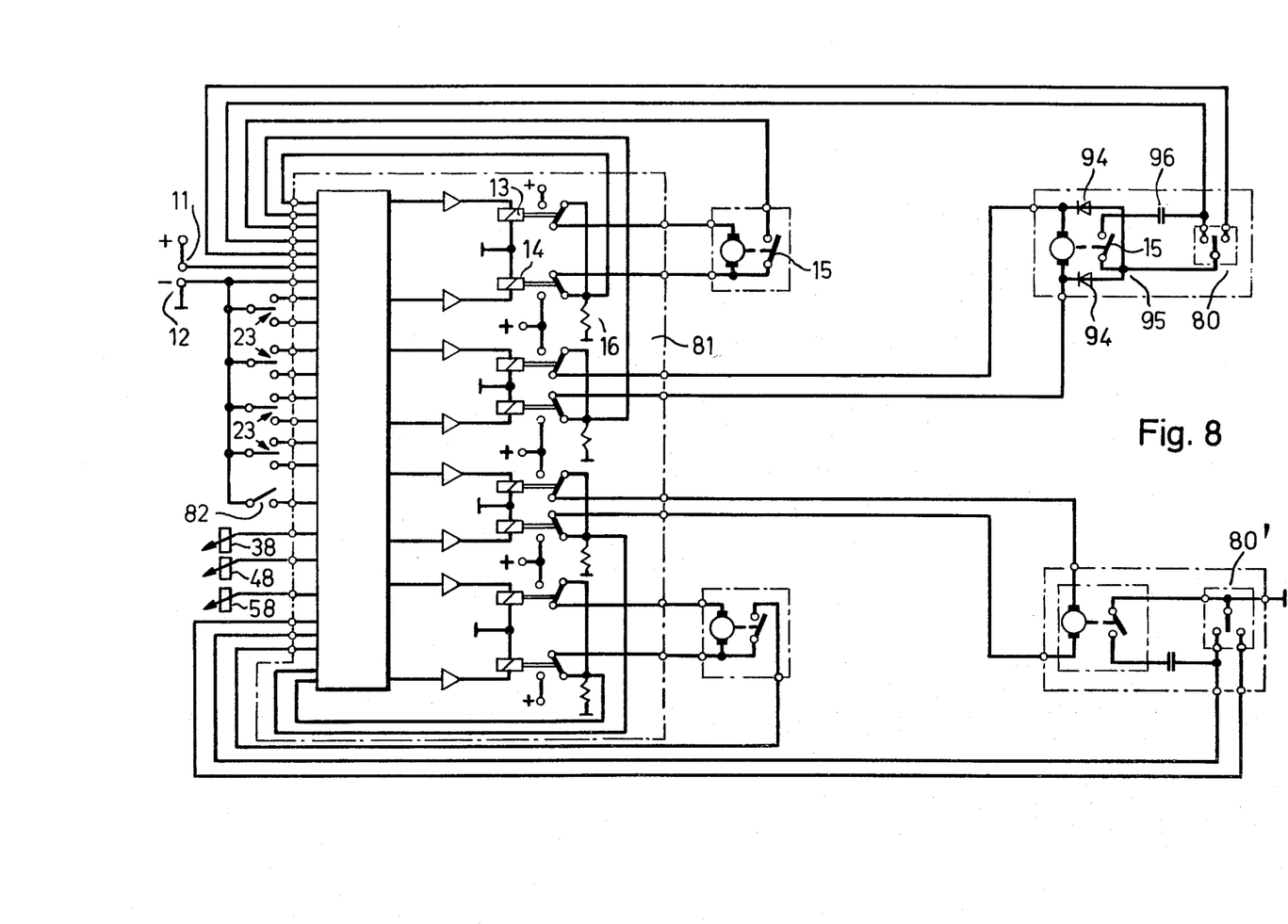

The version according to FIG. 7 seems to be much simpler. Here a changeover relay 92 is assigned to each motor which operates a two-way switch which either connects the motor to the leads of the operating switches 23 or 80 or to the control lead 93, which is connected with the positive pole of the voltage source, when the relay is excited with an available switching signal. This control lead 93 is conducted to all motors of the various window lifter installations. In this connection it is essential that via this control lead 93 on the one hand the relay 92 is excited, but on the other hand also the motor current flows through it, so that an additional lead can be saved. Because only one control lead is necessary to start the compulsory downward movement in this embodiment it could be also provided to change over that motor to downward operation whose power-dependent value has been previously evaluated as a case of trouble. Such an embodiment is also shown by FIG. 8. Here in the central control unit 81 two relays 13 and 14 are provided for each motor which are controlled according to the principle of FIG. 1 by the assigned operating switches 23. One is able to comprehend the function of this system, if one presumes that the central control unit 81 has a system according to FIG. 1 for each motor. Of course it is also conceivable that the switching stage 18 operates in multiplex operation for the evaluation of the power-dependent value and practically interrogates the individual values in cyclic succession and controls the appropriate relay 13 or 14. The individual threshold values which were described in connection with FIG. 3 are adjusted via the trimmers 38, 48, 58.

In connection with FIG. 8 it has additionally to be pointed out to an important detail. Whereas in the version according to FIG. 1 a separate earthing connection is necessary for the position switch 15, now said position switch 15 is connected to the motor lead conducting earth potential during upward operation. One thereby started from the consideration that this position switch 15 is only effective, in case upward operation is switched on.

In order to provide that a separate earthing connection to the switches 80 at the back doors of the motor vehicle are also saved one can tap off an earth signal at the motor terminals via diodes 94 in the switching point 95. This signal is conducted to the movable changeover contact of the operating switch 80. Besides the earth potential produced in this manner at the switching point 95 is also utilised for the position switch 15, whose switching signal is switched on the lead dynamically, namely via the capacitor 96, which lead is not controlled by the operating switch 80 during upward operation. Of course earth can also be tapped off from the chassis as it is shown for the switch 80'.

Figure 9:
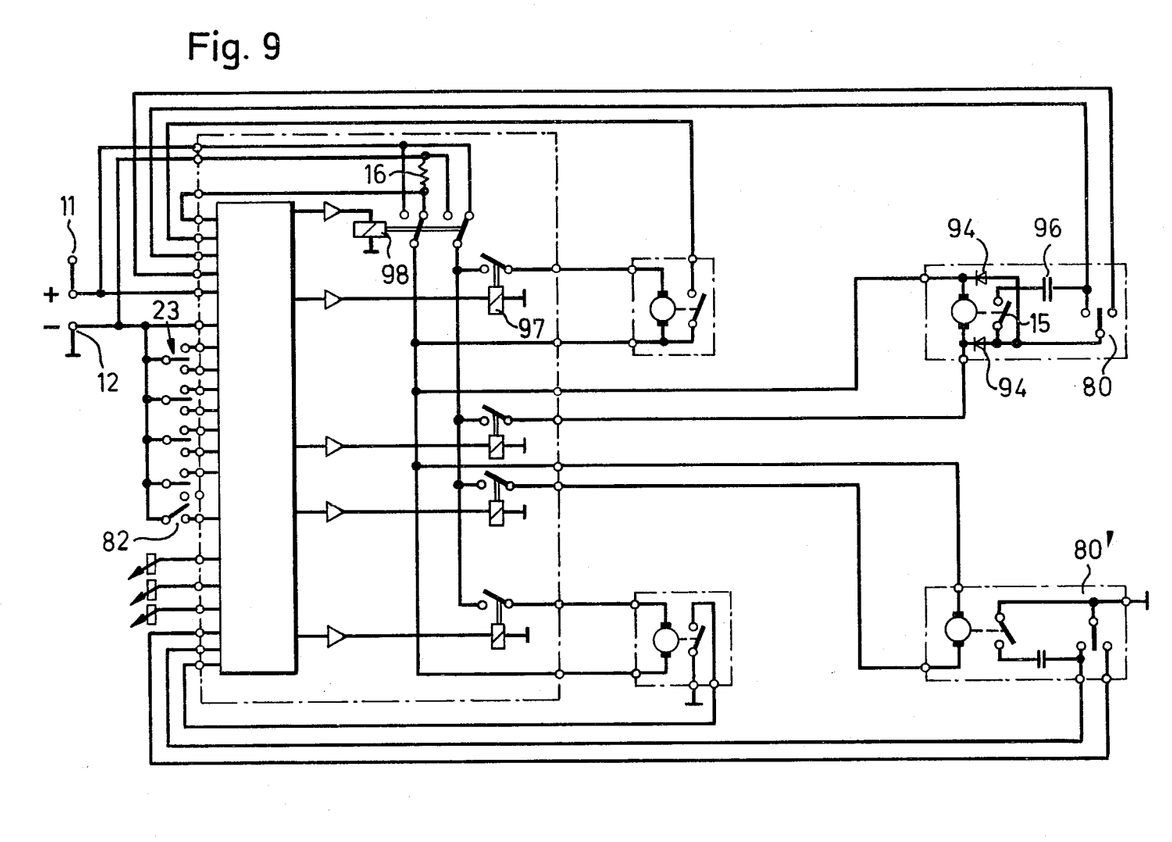

FIG. 9 now shows a version which is built up on that of FIG. 8. Indeed now to each motor only a separately controllable relay 97 is assigned through which the motor current is switched. The direction of rotation for all motors is determined via the relay 98. Though this circuit arrangement is less complicated it involves however the disadvantage that the motors cannot be operated with different direction of rotation simultaneously.

Figures 10, 11:
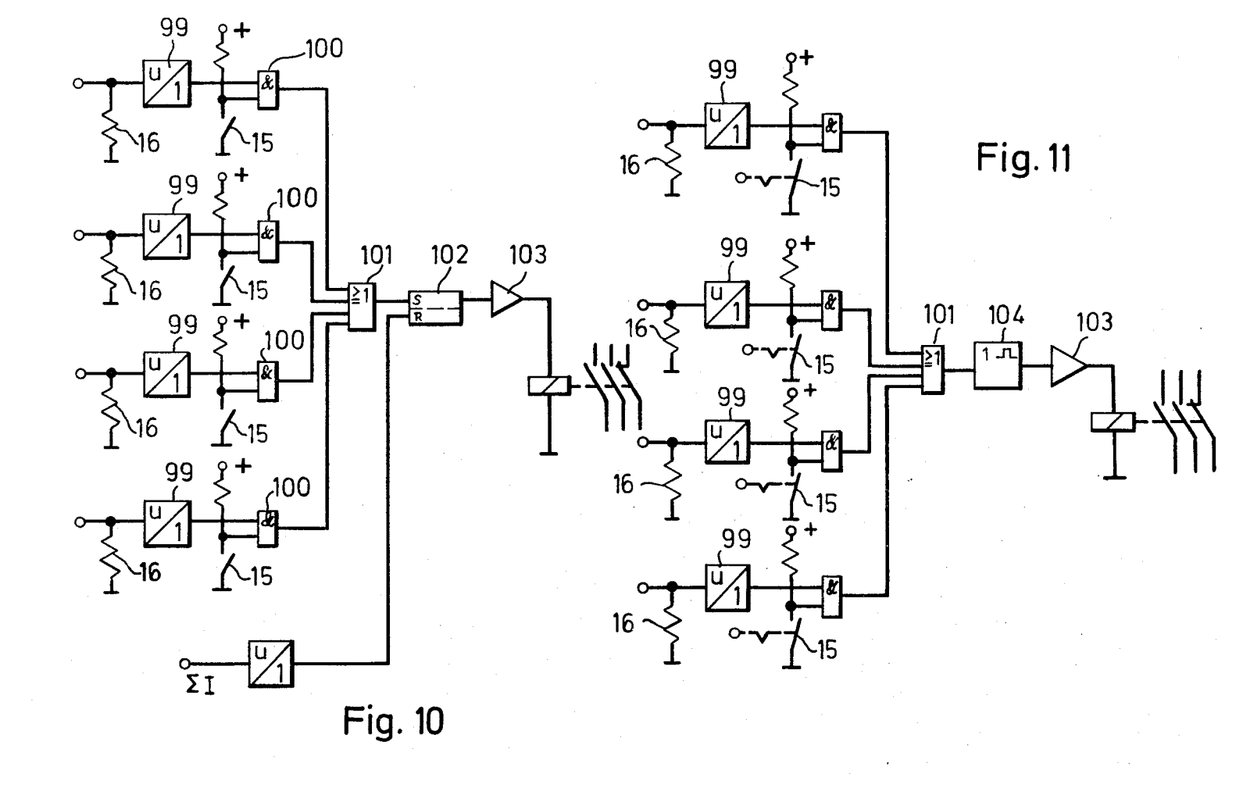

In FIG. 10 it is indicated how one can imagine the evaluation of the power-dependent values in the central control unit 81. The switching signals each are connected with the signals of the position switches 15 via a signal converter 99 and an AND-gate 100 and jointly switches them to an OR-gate 101. The OR-gate 101 sets a store 102 which on its part controls the relay or the relays of the central control unit via an amplifier 103. In case that a switching signals is available from one of the motors this store 102 is set. The reset input of said store 102 is acted upon by a signal which detects the sum of all currents of the separate motors. As soon as this sum exceeds a given threshold value the store 102 is reset. Thus the motors are all switched off at the same time.

In the embodiment according to FIG. 11 it is done without the detection of the sum of the current. Instead a timing element 104 is controlled via the OR-gate 101, whereby the instable phase of said timing element is selected in such a way that it can safely be assumed that during this time interval all motors occupy their lower end position.

Figure 12:
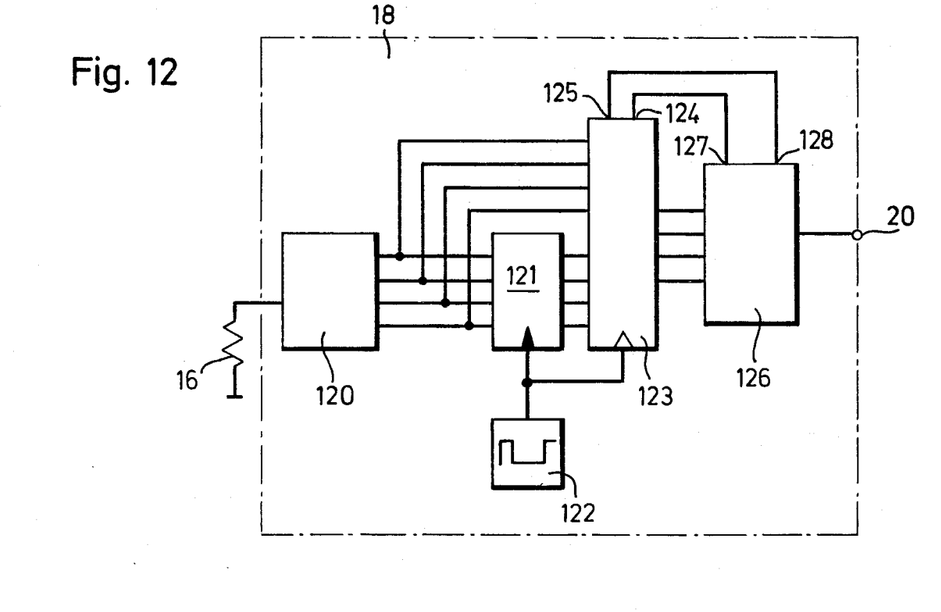

For the sake of completeness a further embodiment of a switching stage 18 is in principle indicated in FIG. 12. In this embodiment an analogue digital converter 120 is provided to which the power-dependent value, in the present example the voltage at the resistor 16, is conducted. Thus at the output of said converter 120 a digital number is available whose size corresponds to the instantaneous value of the motor current. This number is conducted to the input of a store 121 which is set at regular time intervals by means of the negative slope of the signal of a clock generator 122. A subtraction circuit is designated by 123, which is triggered with the positive slope of the output signal of the clock generator 122. At the time of triggering said subtraction circuit forms the difference between the number tapped off from the output of the converter 120 and the number supplied by the store 121. Thus at the output of the subtraction circuit 123 a number may be detected which is proportional to the temporary increase of the power and of the current respectively. The subtraction circuit 123 includes a kind of comparator in such a way that a signal may be measured at the output 124 as soon as the difference is smaller than a given value. In contrast thereto a signal may be measured at the output 125 as soon as the difference which is formed by the subtraction circuit 123 is equal to or bigger than a given value. The output signal of the subtraction circuit 123 is conducted to an addition circuit 126. This addition circuit has a quenching input 127 which is connected to the output 124 of the subtraction circuit. The addition circuit only performs an addition, when at the output 125 of the subtraction circuit a signal may be measured which is conducted to an input 128 of the addition circuit.

This embodiment in detail operates in such a way that the number which is available at the output of the subtraction circuit in regular intervals and which is a measure for the temporary change of the current, is successively added up in the addition circuit 126 as soon and as long as a signal may be measured at the output 125. If however the difference formed is once smaller than the given threshold value the addition circuit is immediately reset to 0.

One can imagine the mode of operation of this circuit arrangement by way of FIG. 2 in such a way that the di shown there are added up as long as the rise of the current curve is bigger than the threshold value indicated by the line a. If in contrast thereto the rise of the current curve falls to a value which is smaller than the rise of the line a, the addition circuit is quenched and the next addition operation begins only, when the critical rise is exceeded again. As soon as a given sum is exceeded in the addition circuit 126 the dynamical switching signal is tapped off at the output 20.

Thus in this embodiment not two absolute values of the current are compared with each other, when the temporary change of the current is exceeded, but the individual differential current changes are summed up. Thus for the following release of the switching signal not a previously stored instantaneous operation value is used, but practically a number 0, which is adjusted at that time before for the first time a too steep current increase is recognised. This circuit arrangement therefore switches off earlier that the versions which were described by way of the FIGS. 1 to 4. The facts can also be described in such a way that the current value designated by $I_3$ in FIG. 2 is used as a reference value and that from that time onwards the power increase is added up in the addition circuit.

Finally it is emphasised that the present version is not only meant for window lifter installations, but can always advantageously be used if a danger of injury is given by the force of movable elements. Here for instance it is thought of a use for electromotively driven files or elevator doors etc. By the circuit arrangement a motor is besides reliably protected against destruction in the case of blocking, so that from this aspect too further possibilities of general application are conceivable, for instance in connection with variable speed drives.

The circuit arrangement only shown in principle can be realised by means of concrete components. In the future one shall however use integrated circuits and realise the circuit arrangement by means of microprocessors or microcomputers. Thereby the circuitry can of course vary from the described version. But the basic idea of the invention is used nevertheless, when the separately stated switching functions are realised. The latter is also valid, when in individual cases digital circuits have been replaced by analogue circuits.

An analogue switching stage which only comprises a few components is described below by way of FIG. 13. The power-dependent value transformed to an electric signal is conducted to the input 17 of a differentiator consisting of the capacitor 150 and the resistor 151. Thus a signal is available at the output of said differentiator which is a measure for the rise of the characteristic shown in FIG. 2. Via the resistor 152 this signal is conducted to a Miller integrator with the transistor 153 and the capacitor 154. The output signal of said Miller integrator is tapped off at the joint switching point of two resistors 155, 156 and conducted to a base of a transistor 157. At the load resistor 159 of said transistor 157 the output signal for the switching element for switching off or on the motor is tapped off.

The embodiment according to FIG. 13 operates as follows. As long as the rise of the characteristic shown in FIG. 2 is only small, only a small voltage may be measured at the output of the differentiator and the transistor 153 is blocked. The capacitor 154 is charged via the resistors 156, 155, 152, 151. The transistor 158 is blocked. Earth potential is applied to the output 20.

If the temporary rise of the power-dependent value exceeds a given threshold value the transistor 153 becomes conductive. Thereby the capacitor 154 discharges. But this discharge can only last until the temporary rise of the power-dependent value exceeds the threshold value. If however the threshold value is not reached at all or the power-dependent value is even reduced, after a given time interval the transistor 153 is blocked again and the capacitor recharged. The switching stage is adjusted in such a way by the variable resistors 151 and 156 that during normal operation the discharge of the capacitor is insufficient to make the transistor 158 conductive. If in contrast thereto the temporary rise of the power-dependent value is very high and the capacitor 154 is consequently very rapidly discharged or the temporary rise of the power-dependent value above the threshold value continues for a given time, the capacitor 154 is discharged so far that the voltage drop at the resistor 156 is sufficient for connecting the transistor 158 through and thus a switching signal is released at the output 20. Thereby in this switching stage the base-emitter space of the transistor 153 of the Miller ingetrator practically operates as threshold switch for the differentiated signal and the Miller integrator as a store, whereby the capacitor voltage follows the characteristic of FIG. 2 in the opposite sense as soon as the rise of the dotted line a has been exceeded. The transistor 158 operates as a further threshold switch which switches in dependence on the capacitor voltage. Thus in this switching stage it is not necessary to store a current value at the beginning of a critical rise, because the capacitor is recharged with any subcritical rise and thus the store is practically set on a reference value. The switching stage according to FIG. 13 especially distinguishes by the fact that individual components, for instance the transistor 153, perform several functions. In the embodiment according to FIG. 13 the store is always reset, when the rise of the current curve falls below the critical value. An embodiment is also conceivable in which-controlled via a timing element not shown in the drawing-the store is reset after expiration of a delay time. This timing element triggered at any time, when the rise of the current curve becomes super-critical. Finally also such a combination is possible in which in dependence on the rise and on the delay time of the timing element the store is reset.

Figure 13:
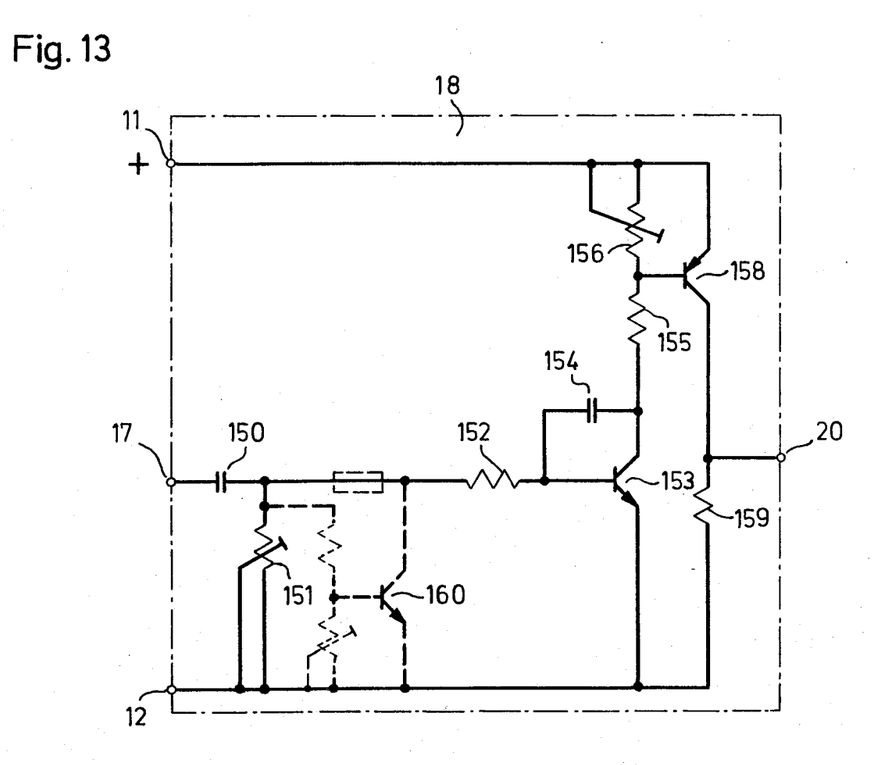

In FIG. 13 several resistors and a transistor 160 are indicated by dotted lines. This enlarging of the circuit has the purpose to make the discharge of the capacitor 154 independent of the size of the rise of the power-dependent value. When in this embodiment the output signal of the differentiator exceeds a given value, the transistor becomes conductive and the course of the discharge of the capacitor is independent of the initial voltage of the differentiator. One could develop further this circuit in such a way that the capacitor is discharged with a constant current and at any time is recharged much more rapidly. Then the release of a switching signal is dependent on the time interval in which the capacitor can discharge or recharge.

What is claimed is:

1. A safety control circuit for the electric motor of a power window for automotive vehicles which senses the motor current and differentiates between a tight fitting of the window pane and an obstacle blockage, said control circuit comprising, in combination:

first means for selectively applying and reversing operating current to said motor wherein said first means applies said operating current to said motor in a selected one of two current directions to reverse the output motion direction of said motor and removes said operating current to stop said motor;

second means for detecting the operating current of said motor for providing a first output signal indicative thereof;

third means having an input coupled to said second means and being responsive to said first output signal for providing a second output signal indicative of the instantaneous value of said first output signal;

fourth means for providing a reference signal indicative of a predetermined instantaneous operating current level;

fifth means having a pair of inputs respectively coupled to said third and fourth means for comparing said reference signal to said second output signal and for providing a third output signal when the level of said second signal exceeds the level of said reference signal during a predetermined time period; and, a switching element coupled between said first means and said fifth means and being responsive to said third output signal to remove or reverse said operating current from said motor when the level of said second signal exceeds the level of said reference signal during said predetermined time period.

* * * * *